(12) United States Patent
Schaal et al.

(10) Patent No.: US 8,433,482 B2
(45) Date of Patent: Apr. 30, 2013

(54) METHOD FOR AUTOMATICALLY ADJUSTING A HEADREST OF A MOTOR VEHICLE SEAT, AND DEVICE FOR CARRYING OUT SAID METHOD

(75) Inventors: Oliver Schaal, Coburg (DE); Gregor Kroener, Bischberg (DE)

(73) Assignee: Brose Fahrzeugteile GmbH & Co. KG, Coburg, Coburg (DE)

(*) Notice: Subject to any disclaimer, the term of this patent is extended or adjusted under 35 U.S.C. 154(b) by 359 days.

(21) Appl. No.: 12/812,233

(22) PCT Filed: Jan. 12, 2009

(86) PCT No.: PCT/EP2009/050267
§ 371 (c)(1),
(2), (4) Date: Jul. 8, 2010

(87) PCT Pub. No.: WO2009/090151
PCT Pub. Date: Jul. 23, 2009

(65) Prior Publication Data
US 2010/0295349 A1    Nov. 25, 2010

(30) Foreign Application Priority Data

Jan. 17, 2008   (DE) .................. 10 2008 000 076

(51) Int. Cl.
*B60N 2/0248*   (2006.01)
(52) U.S. Cl.
USPC .......................................................... 701/49
(58) Field of Classification Search .......... 701/49; 180/273
See application file for complete search history.

(56) References Cited

U.S. PATENT DOCUMENTS

| 4,645,233 A * | 2/1987 | Bruse et al. ................ 280/801.2 |
| 6,088,640 A * | 7/2000 | Breed .............................. 701/45 |
| 2003/0090133 A1 | 5/2003 | Nathan et al. |
| 2007/0267909 A1 | 11/2007 | Truckenbrodt et al. |

FOREIGN PATENT DOCUMENTS

| DE | 37 30 210 A1 | 3/1989 |
| DE | 44 33 601 C1 | 4/1996 |
| DE | 100 65 845 A1 | 8/2002 |
| DE | 102 50 416 A1 | 8/2003 |
| DE | 10 2006 023 102 A1 | 11/2007 |
| GB | 2 301 906 A | 12/1996 |

OTHER PUBLICATIONS

English translation of Chinese Office Action dated Feb. 17, 2012 for application No. CN 200980102552.0, 5 sheets (DE 44 33 601 C1 is cited in this Office action).
International Search Report, dated Apr. 2, 2009, corresponding to PCT/EP2009/050267.
English translation of International Preliminary Report on Patentability dated Aug. 10, 2010 for corresponding PCT Application No. PCT/EP2009/050267, 8 sheets.

* cited by examiner

*Primary Examiner* — Michael McCullough
(74) *Attorney, Agent, or Firm* — Christie, Parker & Hale, LLP

(57) ABSTRACT

A method for automatically adjusting a headrest of a motor vehicle seat, which can individually be adjusted to a passenger occupying the motor vehicle seat with a sensor array and an electronically controlled adjusting device such that the headrest is in an adjusted position which is defined as optimal as possible for absorbing acceleration forces acting on the head of the passenger in a case of crash is provided. The adjusting device can be controlled via a control unit which evaluates at least one signal of at least one sensor, in order to control the adjustment of the headrest with the adjusting mean. At least one signal from the at least one sensor serves to detect an occupation of the motor vehicle seat by a passenger.

20 Claims, 3 Drawing Sheets

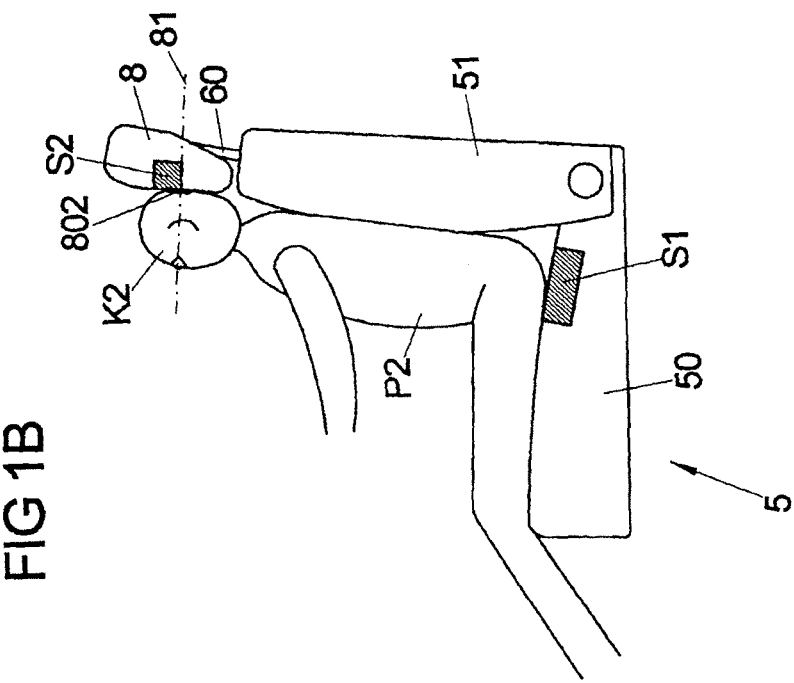
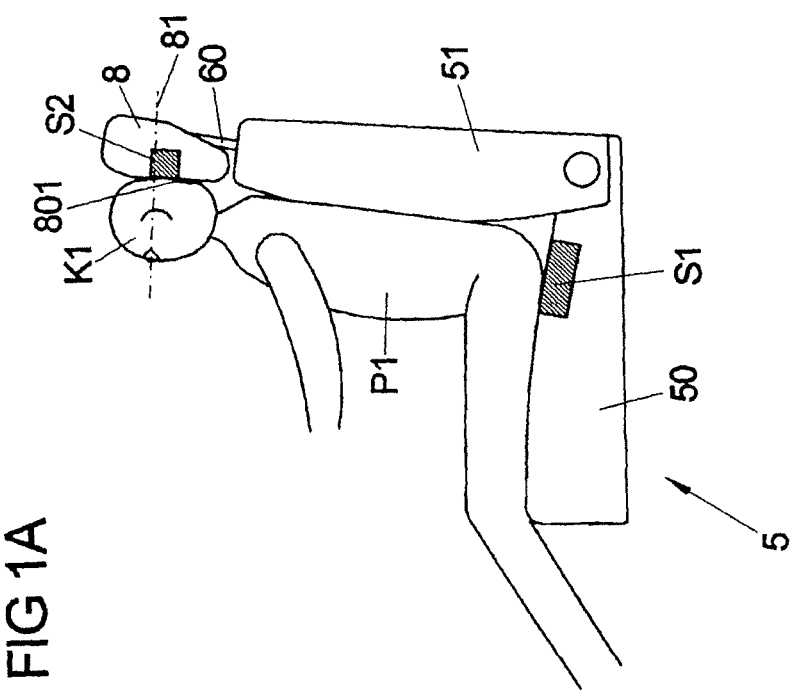

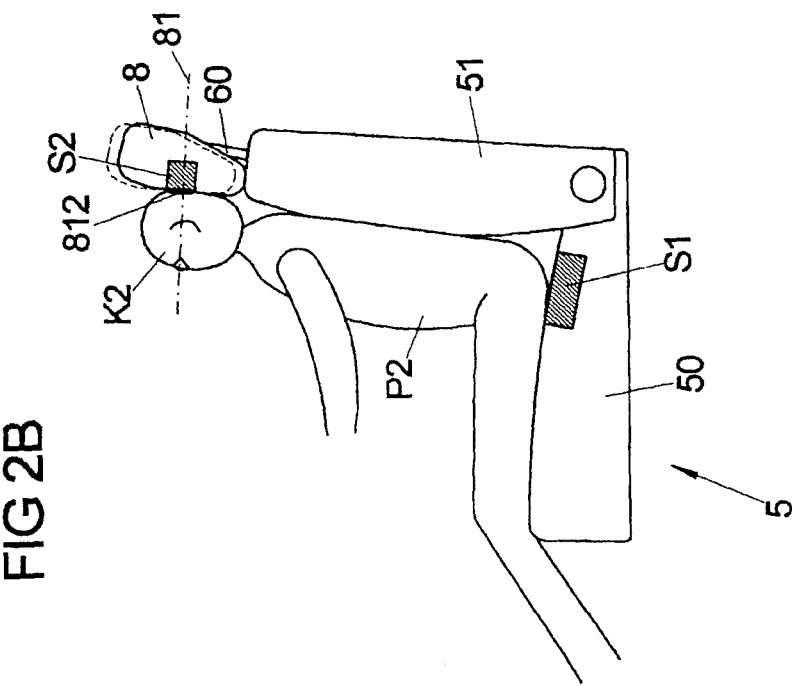
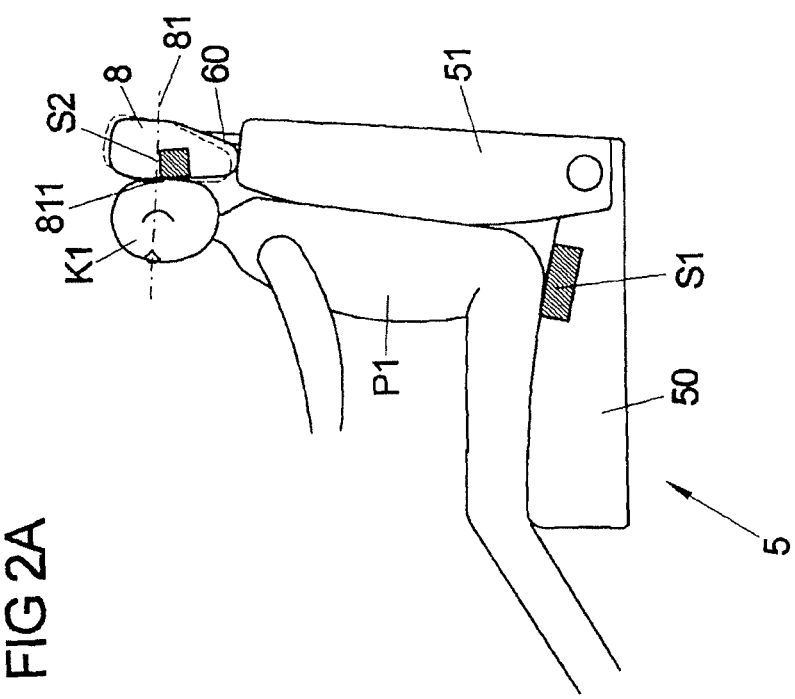

METHOD FOR AUTOMATICALLY ADJUSTING A HEADREST OF A MOTOR VEHICLE SEAT, AND DEVICE FOR CARRYING OUT SAID METHOD

CROSS-REFERENCE TO A RELATED APPLICATION

This application is a National Phase Patent Application of International Patent Application Number PCT/EP2009/050267, filed on Jan. 12, 2009, which claims priority of German Patent Application Number 10 2008 000 076.0, filed on Jan. 17, 2008.

BACKGROUND

This invention relates to a method for automatically adjusting an adjustable headrest of a motor vehicle seat and to a device for carrying out said method.

In connection with an increase of the passive safety inside a motor vehicle, the headrests mounted on motor vehicle seats make an essential contribution. They serve to absorb acceleration forces which act on the head of a passenger in a case of crash. To be able to provide an optimum protection, the headrests must be adjusted to the respective passenger and his stature such that they contact the head of the passenger approximately at the level of the ears. A headrest making contact too high or too low on the other hand increases the risk of injury in a case of crash. For this reason, height-adjustable and tiltable headrests are widely known from the prior art, which allow an adjustment of the headrest by the passenger.

An automation of the height adjustment of the headrests is also known from the prior art. In DE 37 30 210 A1, for example, a device for height adjustment of a headrest is described, which provides for an individual adaptation by means of a sensor array detecting the head height.

The person occupying the vehicle seat associated to the headrest, however, should still touch the headrest with his head or neck even at the lowest height position of the headrest. Furthermore, the described invention only is intended for a one-time adjustment, i.e. to be made before start of the drive, which moreover does not take into account whether the vehicle seat is occupied by a person or an object.

DE 44 33 601 C1 describes a method and a device for activating or deactivating safety-relevant systems inside the passenger cell of a motor vehicle. Among other things, a sensor means is described, which is focused on the head region of the motor vehicle seat, so as to detect an occupation by a passenger. Beside the specific adaptation to the passenger or his seating position, the activation or deactivation of further safety means, such as airbags, furthermore is controlled therewith. What remains disadvantageous in this invention on the one hand is the person-related adjustment of the headrest, which always requires a measurement of the seat occupation for a position adjustment. On the other hand, only the lowermost adjustment position of the headrest will be moved to in the case of a non-detected seat occupation. In this position, however, the headrest normally will increase the risk of injury for a passenger, when the occupation has been detected erroneously.

SUMMARY

Therefore, it is the problem underlying the invention to provide a method which overcomes said disadvantages and improves an automatic adjustment of the headrest.

According to an exemplary embodiment of the invention, there is provided a method for automatically adjusting a headrest of a motor vehicle seat, wherein the headrest can individually be adjusted to a passenger occupying the motor vehicle seat by means of a sensor array and an electronically controlled adjusting means such that the headrest is in an adjusted position which is defined as optimal as possible for absorbing acceleration forces acting on the head of the passenger in a case of crash. The adjusting means can be controlled via a control unit which evaluates at least one signal of at least one sensor, in order to control the adjustment of the headrest by means of the adjusting means. At least one signal from the at least one sensor serves to detect an occupation of the motor vehicle seat. In accordance with the invention, the headrest is transferred into a safety position after at least one first signal to the control unit, which safety position is independent of a passenger and can differ from the adjusted position. Only in response to at least one second signal will the headrest be adjusted individually and in dependence on the occupation of the motor vehicle seat associated to the headrest.

Exemplary in response to at least one third or subsequent signal the individual adjustment of the headrest is checked and/or adapted.

In this way, there is first taken a safety position of the headrest, which is not bound to a specific person and even in unforeseeable cases provides a minimum of safety for the head region of a passenger. In response to a first signal, which is generated e.g. by a seat occupation, the activation of the door lock or the ignition, or by opening the motor vehicle door, the headrest is transferred into a safety position. This safety position of the headrest substantially is defined in that in this position or location the headrest on the one hand does not clear an injury-critical region between the upper edge of the backrest and the lower edge of the headrest. On the other hand, the headrest is not adjusted too low in the safety position, so that there is no increased risk for an injury of the neck region of taller passengers.

Before the start of the drive, the control unit evaluates the signal or signals of a sensor or a plurality of sensors, so that already before a movement of the motor vehicle a person-unspecific minimization of the risk of injury in a case of crash can be ensured. For the evaluation by the control unit an evaluation logic can be provided for example, or a single specific signal is generated, which directly initiates the taking of the safety position by the headrest. Such signal preferably is generated by a sensor which directly or indirectly detects a seat occupation. The sensor can be accommodated e.g. in the belt buckle and generate a signal upon snap-in or closure of the safety belt, or a sensor or sensor mat, which is understood to be a "sensor" in the sense of the method of the invention, is provided in the seat bolster or the headrest itself. In such a case, weight sensors in the seat adjusting mechanism or an optical sensor or a camera likewise are conceivable.

After this transfer into a safety position independent of the stature of a passenger, the headrest is adjusted to the passenger in response to a second signal of a further or the same sensor. The headrest takes an adjusted position, which according to predefined parameters should provide an optimum protection for the passenger in a case of crash. In other words, a fine adjustment is made or initiated, which is adapted to the individual head position or body posture and hence ensures a protection of the passenger in a case of crash, which is regarded as "optimal" according to the respective state of knowledge.

This second signal or a plurality of second signals, which are evaluated by the control unit via an evaluation logic, preferably are generated after start of the drive. The adjustment of the headrest to the head position or body posture is effected during the drive and the headrest is not adjusted with reference to a different posture taken before start of the drive.

Consequently, at least one second signal can be generated by a sensor which detects a movement of the motor vehicle. Alternatively or in addition, the second signal only is generated after a certain driving time or is generated on the basis of a detected movement of the passenger. Preferably, a combination of such second signals is evaluated by the control unit and the headrest hence is adjusted or its adjustment is activated on the basis of different sensor signals. In an exemplary configuration it thus is possible to individually adjust the headrest to the passenger after start of the drive and after reaching a certain velocity.

As a signal which can serve for an activation of the fine adjustment, the signal from a sensor on a belt winding reel for a safety belt can also be used. It is assumed that after unreeling the safety belt from a reel or winding roller for fastening the seat belt, the passenger will take a constant seating posture with a constant position of the winding roller. Alternatively or in addition, a sensor furthermore can provide a signal when no particular head movement is registered.

If according to an inexpensive and simplified variant only exactly one sensor is used in the method of the invention, which detects the seat occupation, the variation of the sensor signal can be employed as a second signal to the control unit. Via a pressure sensor in the motor vehicle seat, the detected, maintained posture of the passenger for example is evaluated as a basis for the fine adjustment of the headrest. However, the interruption of the seat occupation detection also can be a trigger for the automatic, specific adaptation of the headrest, as it can then be assumed that the posture of the passenger has changed.

It is decisive that via the second signal or a plurality of second signals to be evaluated it preferably is ensured that the passenger either is in a constant position or at least such constant position is recommendable in a driving situation. The height and/or location of the headrest therefore can be adapted to provide an even higher degree of safety for the passenger. Of course, the individually adjusted position of the headrest, which is taken in response to at least one second signal, can be different from the safety position or correspond with the same.

In response to a third signal or a plurality of third signals, which are evaluated by the control unit, the current settings of the headrest are checked in accordance with a preferred aspect of the method of the invention. If at least one such signal is evaluated to the effect that a readjustment of the headrest is necessary, the headrest is again adapted to the passenger or his new posture.

In this way, it is guaranteed that a change in the situation, on the basis of which a first specific adjustment of the headrest was made, will also lead to a change in the headrest setting. For such checking of the individual position or its initiation, at least one signal of at least one sensor preferably is used, which suggests a distinct variation of the seating position. Again, this can be a sensor on the belt winding reel or on a component of the motor vehicle seat used for seat adjustment. Such third signal can also be generated as a result of the standstill of the motor vehicle or the opening of a motor vehicle door. In addition to or as a basis for the signal generation, time intervals can also be specified, after which the previous settings of the headrest must again automatically be individualized for the passenger.

In one exemplary embodiment, a relevant movement of a belt winding reel can be registered by a sensor. Within a specified time interval it is then monitored whether it again takes the original position. If this does not occur, a new seating posture or a changed seat occupation must be assumed. The control unit will correspondingly evaluate these associated "third" sensor signals, so that the previous setting of the headrest is checked and possibly an adaptation of the setting is initiated. Such checking or monitoring of the head rest setting will be maintained, until for example the vehicle has been parked.

For the individual adaptation of the headrest to a detected passenger, various methods are possible in principle. Preferably, the sensors or their signals, which are utilized for the different method steps, are also used for detecting and automatically adapting the headrest. This means that the at least one signal of a sensor preferably does not only activate the person-related headrest adaptation or the checking thereof. Rather, at the same time it is at least part of the corresponding method or of the associated device and provides e.g. a setpoint for the adjustment of the headrest.

In accordance with the method, a control unit can be formed and provided to evaluate a plurality of first, second, third and/or subsequent sensor signals. As a result, checking the setting or the realignment of the headrest each can be initiated only after the encounter of a plurality of signals.

To inform the passenger seated on the respective motor vehicle seat and/or the driver of the motor vehicle about a current or performed adjustment of the headrest, the method of the invention provides a visual or acoustic message in accordance with a preferred variant. Via a display or audio component, the passenger and/or the driver thus is informed about the progress of the automatic adjustment of the headrest.

The method preferably is expanded to the effect that an error is logged by means of an electronic diagnostic unit, if the adjustment or movement, respectively, of the headrest could not be performed successfully. It becomes possible, for example, to read out the error in a workshop and determine the type of error more easily.

An only incompletely performed or missing adjustment of the headrest possibly leads to the fact that the headrest is in a position or location which increases the risk of injury for a passenger. For this reason, it is preferably provided to move the headrest into the safety position when an adjustment has not been performed successfully or an intended target position and/or final position of the headrest has not been reached.

If the transfer into the safety position is not possible either, the passenger and/or the driver will not only be informed accordingly, as described above, but then it is preferably provided to permit a manual adjustment of the headrest. A potentially increased risk of injury, which no longer can be minimized automatically, thereby is optionally reduced by a passenger.

To exclude that in such case the passenger adjusts the headrest only according to aspects of comfort and possibly adjusts the headrest such that it does not provide an optimum protection in a case of crash, the passenger preferably only is permitted to perform a transfer into the safety position.

In a further exemplary aspect, the described method for automatically adjusting a headrest provides to move the headrest into its lowermost adjustment position when it has been detected that the motor vehicle seat is not occupied or is occupied with an object. This provides for a maximum view to the rear, if the protective function of the headrest is not required.

Depending on the configuration of the sensors which generate the signals relevant for the method, such detection of the seat occupation or kind of seat occupation can already be effected with the first signal or signals to be evaluated by the control unit. Accordingly, the possibility is included that the headrest is transferred into the lowermost adjustment position directly subsequent to the safety position.

In an d exemplary variant of the method it likewise is provided that the sensors or the exactly one sensor, which are used in accordance with the method described, not only activate the automatic adjustment of the headrest. Rather, it is favored that at least one sensor or at least one signal of the at least one sensor is at least part of a sensor array, by means of which the automatic individual adjustment or adaptation of the headrest is performed.

This should mean for example that such sensor or such signal is evaluated by the control unit or an additional evaluation unit to the effect that it serves as a basis for the desired adjustment of the headrest.

Beside the at least one sensor, the device used for carrying out the method consists of the control unit for evaluating the at least one signal of the at least one sensor and for controlling the adjustment of the headrest. The control unit furthermore is connected with the adjusting means and the sensor array for the individual adjustment of the headrest. It furthermore includes an evaluation logic, which evaluates the signals from a sensor or a plurality of sensors as first, second and possibly third signals for the automatic adjustment in accordance with the method of the invention.

The adjusting means consequently is understood to be any mechanical and/or electronic device by means of which the headrest can be adjusted and be positioned relative to a backrest of the motor vehicle seat. In response to a control signal of the control unit, it thus can realize the adjustment of the headrest and for this purpose be connected with further or corresponding sensors, which allow the same to determine actual data of the position of the passenger and specified data of the headrest position, respectively. These functionalities can also be provided by the control unit, and the adjusting means only performs the adjustment specified by the control unit. Possibly, the adjusting means includes the at least one necessary drive.

In an exemplary configuration of the device, the control unit also is connected with a diagnostic unit, which is formed and provided to visually and/or acoustically inform the passenger in the case of an unsuccessfully performed adjustment of the headrest and to log an error.

Furthermore, this diagnostic unit can also be configured to initiate an adjustment of the headrest into the safety position, when the adjustment of the headrest has not been performed successfully. For this purpose, for example, it generates a control signal which is transmitted to the control unit or directly to the adjusting means.

To accommodate the sensors and the device as space-savingly and effectively as possible, at least one sensor preferably is integrated in the headrest. For the same reason, a drive for the adjustment of the headrest preferably is integrated in the control unit.

To enable the detection of the seat occupation or possibly a change in the body posture of the passenger in a comprehensive and largely disturbance-insensitive manner, at least one sensor of the device preferably is formed as an ultrasonic sensor. Alternatively or in addition, at least one sensor furthermore can be formed as an optical sensor, e.g. as a camera.

Corresponding to the above explanations, the device in accordance with a further aspect is formed and provided to enable a passenger to manually adjust the headrest only when the automatic adjustment cannot be performed. In this way, it is guaranteed on the one hand that the passenger can assume an optimum setting of this safety system, unless he is visibly or audibly informed about a defective function. On the other hand, a manual adjustment is at least permitted in the case of a malfunction. In a preferred embodiment, such manual adjustment will however only be permitted in so far as the headrest must be transferred into the safety position. Thus, it can be excluded that the passenger possibly chooses a position which is unfavorable in a case of crash. Such an embodiment can be provided in a simple manner at the adjusting means for example via a mechanical snap-in function.

BRIEF DESCRIPTION OF THE DRAWINGS

Further features and advantages of the invention will become apparent from the following description of embodiments with reference to the Figures.

FIG. 1A: shows a side view of a motor vehicle seat with a passenger seated thereon and a headrest in the safety position.

FIG. 1B: shows a side view of the motor vehicle seat of FIG. 1A with the headrest in the safety position and a passenger seated on the motor vehicle seat, who is smaller than the passenger of FIG. 1A.

FIG. 2A: shows a side view of a motor vehicle seat with a passenger seated thereon corresponding to FIG. 1A and of the headrest in an individually adapted adjusted position.

FIG. 2B: shows a side view of a motor vehicle seat with a passenger seated thereon corresponding to FIG. 1B and of the headrest in an individually adapted adjusted position.

DETAILED DESCRIPTION

Figure 3:
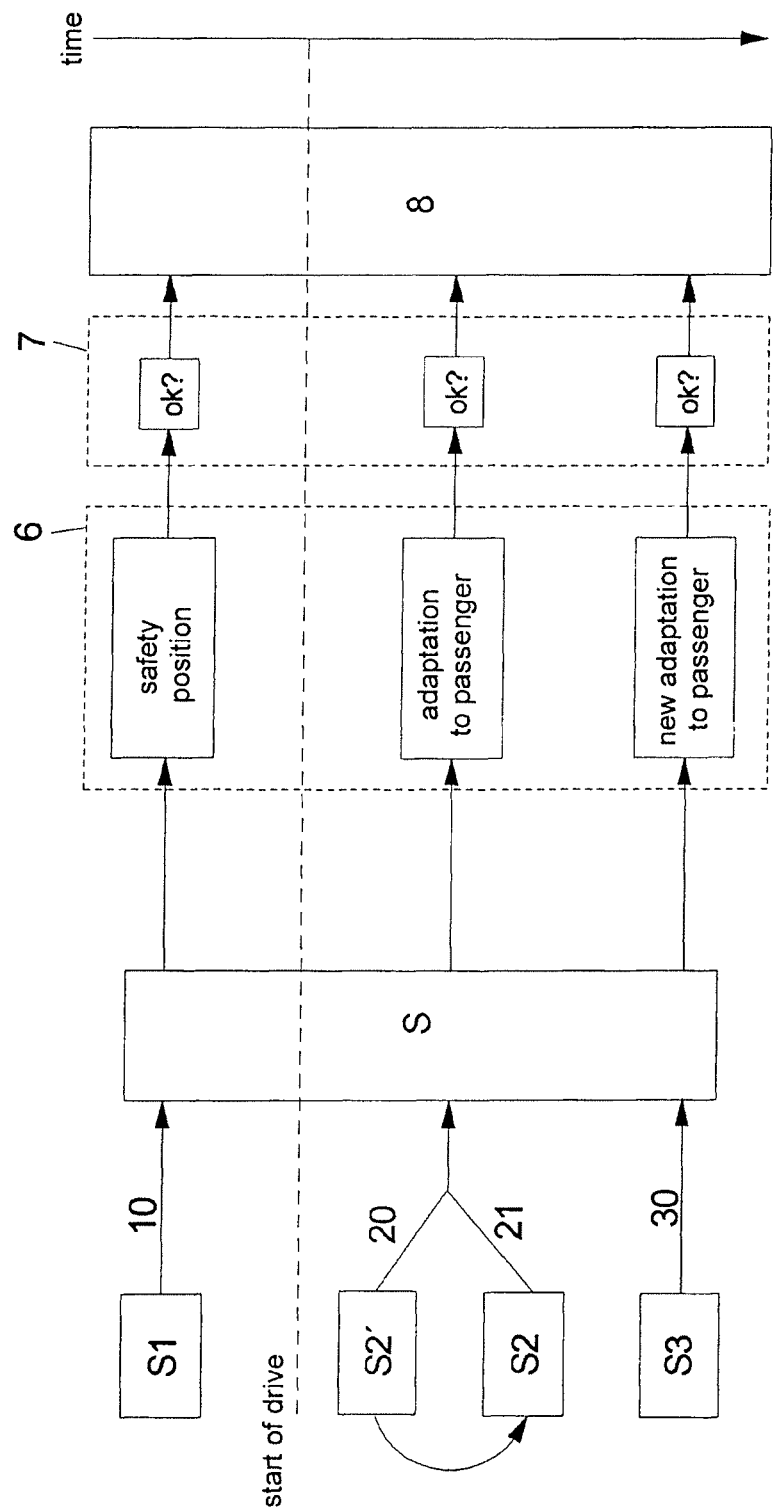
FIG. 3: shows a schematic flow diagram of a method variant.

FIG. 1A shows a side view of a motor vehicle seat 5 with a seating surface 50, a backrest 51 and a headrest 8. The headrest 8 is connected with the backrest 51 via an adjusting means, as part of which a holding rod 60 is shown in FIG. 1A. The holding rod 60 protrudes from the upper end of the backrest 51 and is mounted to or in the headrest 8. In a known configuration of an adjusting means, the headrest 8 can be moved relative to the backrest 51 via a drive which is in operative contact with the holding rod 60. Furthermore, a passenger P1 is shown in a seated position on the motor vehicle seat 5. His head K1 contacts the headrest 8 with the back of the head at a contact point 801.

In the representation shown, the headrest 8 is in the safety position, which is taken in response to at least one first signal. Said safety position substantially is characterized in that the headrest 8 is in a position relative to the backrest 51, in which the risk of injury is minimized for the passenger P1 in the case of an accident. Between the headrest 8 and the backrest 51 no region therefore is cleared, in which the head of a person occupying the motor vehicle seat 5 might fit. A headrest 8 set too low also is avoided, which would involve the risk that the contact point 801 lies in the region of the neck of the passenger P1. This would increase the risk of a neck fracture in a case of crash. The orientation and height of the headrest 8 relative to the backrest 51 thus ensure that the risk of injury is not unnecessarily increased for the passenger P1 by a wrongly adjusted headrest 8.

At least one first signal, which causes the safety position of the headrest 8 to be taken, is generated for example by a sensor which detects the opening of the vehicle doors of a previously parked motor vehicle or detects the entry of a passenger P1. Thus, the headrest 8 preferably is moved into the safety position before a possible start of the drive. In the variant shown here, a sensor S2 is accommodated in the headrest 8 and a sensor S1 in the seating surface 51. These can be sensors of known construction, which are able to detect a seat occupation for example by means of ultrasound or pressure measurement. In the representation shown here, the sensor S1 hence will generate a first signal when the passenger P1 has taken a seat on the motor vehicle seat 5.

For an optimum adjustment, the contact point 801 of the back of the head of a passenger P1 with the headrest 8 always should be located in a region of the back of the head which in a side view is defined with a line 81 extending horizontally through the eye and the ear of the passenger. The passenger P1 shown in FIG. 1A, however, has a posture or stature with which the contact point 801 is below this line 81 in the safety position of the headrest 8. Due to the current safety position of the headrest 8, the head K1 of the passenger P1 at least experiences a support at the contact point 801 in the case of a crash, so that the headrest 8 can absorb part of the acting acceleration forces.

FIG. 1B further illustrates the mode of operation of the safety position. Here, the same motor vehicle seat 5 is shown with a smaller passenger P2 seated thereon. Due to the corresponding safety position, the headrest 8 assumes an orientation or position in which the smaller passenger P2 with his head K2 also rests against the headrest 8 via a contact point 802 at the back of his head. Since the passenger P2 is smaller than the passenger P1 of FIG. 1A described above, his contact point 802 with the headrest 8 lies above the line 81 which indicates the adjusted position of the headrest 8 defined as "optimal" relative to the head K2 of the passenger P2.

Due to the fact, however, that the head K2 of the passenger P2 rests against the headrest 8 in the safety position, it is quite obvious that the safety position automatically taken independently by a passenger in any case minimizes the risk of injury. If the safety position is taken before the start of the drive, an increased degree of safety can already be provided for the passenger P2 in a simple way along with or shortly after entering the motor vehicle.

The safety position to be taken only depends on the motor vehicle seat 5 and is preset in dependence on its configuration. In accordance with the method it can be provided that the safety position is adapted to a seat position. In other words, it can for example be considered that with a strong inclination of the backrest 51 and with a first signal of the sensor 1 a safety position is taken automatically by the headrest 8, which differs from a safety position with upright backrest 51.

In FIGS. 2A and 2B, the motor vehicle seat 5 is shown with the passengers P1 and P2 of the preceding Figures, wherein the headrest 8 is in a position adapted to the respective passenger P1 and P2. This adapted position is effected by an automatic adjustment of the headrest 8. The same is effected in response to at least one second signal of the sensor S2. In one variant, the sensor S2 detects the head movement or posture of the head K1 or K2 of the passenger P1 or P2, respectively. If the sensor S2 no longer detects any significant movement of the head K1 or K2 over an extended period of a few seconds after the start of the drive, it generates a signal. Thus, it is assumed that the passenger P1 or P2 has taken a permanent posture or maintains a certain posture on the motor vehicle seat 5. With reference to the posture to be determined or on the basis of actual data measured, a desired position of the headrest 8 then is determined and moved to automatically.

It can be advantageous to utilize the signal-generating sensors 51 and S2 not only for activating the setting of the headrest 8, but to determine actual data on the basis of their signals, which are utilized for the adjustment of the headrest 8.

Instead of only one signal of a sensor it is of course also possible to evaluate a plurality of signals of the sensor S1 and of the sensor S2 via an evaluation logic integrated in a control unit and then initiate or perform the adjustment of the headrest 8. For example, the automatic individual adaptation of the headrest 8 only is performed when a sensor S2 configured as ultrasonic sensor has detected the head K1 or K2 of a passenger P1 or P2 and via a further sensor in a belt buckle of the safety belt a signal has been generated when fastening the seat belt of the passenger P1 or P2.

Due to the individual adjustment of the headrest 8 only in response to at least one second signal, the protective function of the headrest 8 is further improved. As can be taken from a comparison with the respective preceding Figures, the contact point 811 at the back of the head of the passenger P1 and the contact point 812 at the back of the head of the passenger P2, which are shown in FIGS. 2A and 2B, each lie on the respective line 81 after the person-specific adjustment of the headrest 8. Thus, an optimum absorption by the headrest 8 of the forces acting in the case of an accident can be assumed.

If after this adjustment of the headrest 8 the posture of the passenger P1 or P2 is changed again or at least substantially, it preferably is provided that this causes at least one further third signal of a shown or additional sensor. A seat adjustment detected by a sensor, a detected actuation of the belt buckle or the rotation of a belt winding reel of the safety belt likewise are conceivable as such third or subsequent signals. In this way, it should preferably be ensured during the drive that the headrest 8 always is located in a height and/or position adapted to the passenger. Thus, monitoring or continuously checking the position of the passenger P1 or P2 is desired.

Alternatively or in addition a subsequent signal can be generated during standstill of the vehicle or on opening of at least one door. In accordance with the embodiment of the method of the invention it likewise is provided to use this at least one third or subsequent signal either for activating the setting or for the adjustment itself.

In principle, instead of signals of one or more sensors or in addition to the same at least one second or subsequent signal can be generated by a timer unit. This provides for an adjustment of the headrest 8 or for checking the current setting even after specified time intervals.

If no seat occupation is detected via the sensor S1 or if it must be assumed on the basis of a signal of the sensor S2 that the seat is occupied with an object and not with a person, the headrest 8 preferably is automatically moved into the lowermost adjustment position. The headrest 8 thus provides a maximum possible range of vision for the driver of the motor vehicle, when its protective function is not required.

FIG. 3 schematically illustrates a flow diagram of a variant of the method or the mode of operation of a corresponding device. To clearly illustrate the chronology of the processes taking place, a time axis is represented. Its origin for example defines the opening of a parked motor vehicle or the entry of a passenger.

Thereafter, a first signal 10 is transmitted to the control unit S via the sensor S1. In correspondence with the preceding Figures, the signal 10 of the sensor S1 is a consequence of a detected seat occupation of the motor vehicle seat 5. As explained already, the signal can, however, also be for example the signal of a door lock sensor or another sensor, which detects the unlocking and/or opening of the motor vehicle.

The control unit S immediately evaluates the first signal 10 of the sensor S1. For this purpose, it preferably includes an evaluation logic, by means of which it can evaluate a signal of the sensor S1 as a first signal 10 for taking the safety position. Hence, it possibly is also able to utilize subsequently generated signals of the same sensor for the individual adjustment of the headrest. The control unit 5 is in contact with an adjusting means 6, which realizes the taking of the safety position. An adjustment of the headrest 8 performed by the adjusting means 6 or the reaching of the desired position is monitored by a diagnostic unit 7.

In the case of an unsuccessfully performed adjustment of the headrest 8, the diagnostic unit 7 is able to log an error which can be read out in a workshop at the latest. Preferably, the diagnostic unit 7 can provide a visual or acoustic information about the adjustment of the headrest 8 to the passenger or at least to the driver of the motor vehicle. For this purpose, it is in contact for example with a display element in the interior of the passenger cell or with an audio component.

In the present case, the motor vehicle is moved after the safety position has been taken. A sensor S2', which preferably detects the movement of the motor vehicle or detects a certain driving speed, generates a second signal 20 to the control unit S. To increase the efficiency of the sensor array, the sensor S2 in the headrest 8 will only become active then. If it now detects no further head movement of the passenger P1 or P2, it generates a signal 21 to the control unit S. For this assumption of a permanent driving posture it is of course possible in a simpler variant that the control unit S uses the signal 20 of the sensor S2', and to utilize a built-in sensor S2 only for the individual adjustment of the headrest 8.

In the diagram shown the control unit S evaluates the second signals 20 and 21 of the sensors S2' and S2 and initiates the individual adjustment of the headrest 8 via the adjusting means 6. The signal 21 transmitted to the control unit S can be utilized for specifying a specific setpoint. The optimum adaptation of the headrest 8 to the person seated on the associated motor vehicle seat 5 here is also monitored by the diagnostic unit 7.

To ensure a permanent adaptation of the headrest 8 to different circumstances, the current setting of the of the headrest 8 is checked in response to a third signal 30 to the control unit S of a further sensor S3 or a new adaptation of the headrest 8 is performed via the adjusting means 6. Such third signal 30 can be issued after a certain driving time or be the result of a detected change in the seating position. In correspondence with the above description, the adjustment of the headrest 8 here again is checked via the diagnostic unit 7.

In an alternative embodiment, at least one third signal or also subsequent signals are generated by one of the sensors 51 or S2, in order to reduce the number of sensor signals to be evaluated or the number of built-in sensors. Accordingly, it is also possible to provide only one sensor S2 which detects the occupation of the motor vehicle seat 5. For this purpose, the one sensor S2 also can generate various signals.

Furthermore, it preferably is provided that after an error detected by the diagnostic unit 7, i.e. in the case of an unsuccessfully performed adjustment of the headrest 8, the headrest 8 is automatically transferred into the safety position. For this purpose, the diagnostic unit 7 is connected with the control unit S and/or with the adjusting means 6.

Furthermore, it preferably is provided that the passenger only can perform the adjustment of the headrest 8 by himself, when the safety position could not be taken automatically. To then exclude, however, an injury-critical adjustment of the headrest 8, it is favored that the headrest 8 can only manually be transferred into the safety position.

In a correspondingly designed device for carrying out the method, this is possible for example by a snap-in function as part of the adjusting means 6. For this purpose, a recess can be provided on the holding rod 60, in which a pin or latch engages in the case of the failed automatic adjustment of the headrest 8, when it has been transferred into the safety position.

The invention claimed is:

1. A method for automatically adjusting a headrest of a motor vehicle seat, wherein the headrest is individually adjustable for a passenger occupying the motor vehicle seat with a sensor array and an electronically controlled adjusting device configured to adjust the headrest to an adjusted position defined as optimal as possible for absorbing acceleration forces acting on a head of the passenger in a case of crash, wherein the adjusting device is controllable via a control unit which evaluates at least one signal of at least one sensor in order to control the adjustment of the headrest with the adjusting device, and wherein at least one signal from the at least one sensor serves to detect an occupation of the motor vehicle seat by a passenger, the method comprising:
  transferring the headrest to a predetermined safety position in response to at least one first signal received by the control unit, the safety position being independent of a position of a passenger's head, wherein the safety position is different from a prior adjusted position or the same as a prior adjusted position; and
  adjusting the headrest in response to at least one second signal individually to the position of the passenger's head and depending on the occupation of the motor vehicle seat associated with the headrest.

2. The method according to claim 1, further comprising at least one of checking or updating the individual adjustment of the headrest in response to at least one third signal or a signal subsequent to the at least one second signal.

3. The method according to claim 1, wherein the at least one first signal is generated before movement of the motor vehicle.

4. The method according to claim 1, further comprising:
  always checking whether an adjustment of the headrest is performed successfully when the headrest is individually adjusted to the position of a passenger's head;
  always providing at least one of visual or acoustic information regarding the adjustment of the headrest; and
  logging an error with a diagnostic unit if the adjustment of the headrest is unsuccessfully performed.

5. The method according to claim 4, further comprising automatically transferring the headrest into the safety position if the adjustment of the headrest is unsuccessfully performed.

6. The method according to claim 5, wherein the headrest is manually adjustable by a passenger when transferring of the headrest into the safety position is not possible automatically.

7. The method according to claim 1, wherein the at least one first signal, the at least one second signal or a subsequent signal is time dependent, wherein the at least one first signal, the at least one second signal or the subsequent signal is provided by a timer unit which generates a signal after a specified time interval, and wherein the signal is generated for the control unit when a certain speed of the motor vehicle is reached.

8. The method according to claim 7, wherein the at least one first signal, the at least one second signal or the subsequent signal is only generated for the control unit when a certain driving time has elapsed.

9. The method according to claim 7, wherein at least one sensor generates a signal when at least one of a motor vehicle door has been opened or a door lock of the motor vehicle door has been actuated.

10. The method according to claim 7, wherein the control unit evaluates each of a plurality of the at least one first signal, the at least one second signal, and subsequent signals, before the control unit controls the adjustment of the headrest.

11. The method according to claim 1, wherein the at least one signal is generated by exactly one sensor which detects the occupation of the motor vehicle seat by a passenger.

12. The method according to claim 1, wherein the at least one signal comprises signals generated by at least two different sensors to be evaluated by the control unit.

13. The method according to claim 12, wherein at least one sensor generates a signal depending on a detected movement of the passenger seated on the motor vehicle seat, depending on a movement of the motor vehicle seat, or depending on the movement of a belt winding reel for a safety belt.

14. The method according to claim 1, wherein the headrest is moved into a lowest adjustment position when a seat occupation by a passenger has not been detected or when an occupation of the motor vehicle seat with an object has been detected.

15. The method according to claim 1, wherein the at least one sensor is part of the sensor array by which an individual adjustment of the headrest is performed.

16. A device for automatically adjusting a headrest of a motor vehicle seat, the headrest being individually adjustable for a passenger occupying the motor vehicle seat, the device comprising:
  a sensor array;
  an electronically controlled adjusting device configured to adjust the headrest to an adjusted position defined as optimal as possible for absorbing acceleration forces acting on a head of the passenger in a case of crash;
  a control unit configured to control the adjusting device, the control unit configured to evaluate at least one signal from at least one sensor in order to control the adjustment of the headrest with the adjusting device;
  wherein at least one signal from the at least one sensor serves to detect an occupation of the motor vehicle seat by a passenger;
  wherein after at least one first signal is received by the control unit, the headrest is transferred into a predetermined safety position independent of a position of the passenger's head, and wherein the safety position is different from the adjusted position or the same as a prior adjusted position;
  wherein in response to at least one second signal, the headrest is adjusted individually to the position of the passenger's head and depending on the occupation of the motor vehicle seat associated to the headrest; and
  wherein the control unit is connected with the sensor array, the at least one sensor and the adjusting device, and wherein the control unit includes an evaluation logic which evaluates the signals from the at least one sensor at least as the at least one first signal and the at least one second signal.

17. The device according to claim 16, wherein at least one of the control unit or the adjusting device is connected with a diagnostic unit, the diagnostic unit configured to at least one of visually or acoustically inform the passenger in the case of an unsuccessfully performed adjustment of the headrest and to log an error.

18. The device according to claim 16, wherein the at least one sensor is part of the sensor array by which the individual adjustment of the headrest is performed, wherein the at least one sensor is provided in the headrest.

19. The device according to claim 16, wherein at least one signal is generated by an optical sensor or by an ultrasonic sensor.

20. The device according to claim 16, wherein the headrest is only manually adjustable by a passenger when the automatic adjustment cannot be performed, and wherein in the case of a manual adjustment, the headrest is only transferable into the safety position.

* * * * *